United States Patent
Yun et al.

(10) Patent No.: US 11,354,163 B2
(45) Date of Patent: Jun. 7, 2022

(54) VIRTUAL MACHINE PLACEMENT METHOD AND VIRTUAL MACHINE PLACEMENT DEVICE IMPLEMENTING THE SAME

(71) Applicant: Okestro Co., Ltd., Seoul (KR)

(72) Inventors: Ho Yeong Yun, Seoul (KR); Young Gwang Kim, Seoul (KR); Min Jun Kim, Seoul (KR)

(73) Assignee: OKESTRO CO., LTD, Seoul (KR)

( * ) Notice: Subject to any disclaimer, the term of this patent is extended or adjusted under 35 U.S.C. 154(b) by 0 days.

(21) Appl. No.: 16/470,364

(22) PCT Filed: May 21, 2019

(86) PCT No.: PCT/KR2019/006072
§ 371 (c)(1),
(2) Date: Jun. 17, 2019

(87) PCT Pub. No.: WO2020/222347
PCT Pub. Date: Nov. 5, 2020

(65) Prior Publication Data
US 2022/0050716 A1   Feb. 17, 2022

(30) Foreign Application Priority Data
Apr. 29, 2019 (KR) .......... 10-2019-0049976

(51) Int. Cl.
*G06F 9/455* (2018.01)
*G06F 9/50* (2006.01)

(52) U.S. Cl.
CPC ...... *G06F 9/505* (2013.01); *G06F 2209/5019* (2013.01)

(58) Field of Classification Search
CPC ...... G06F 9/505; G06F 9/5083; G06F 9/5044; G06F 9/45558; G06F 2209/5019; G06F 2009/4557; G06F 3/04832
See application file for complete search history.

(56) References Cited

U.S. PATENT DOCUMENTS

| | | | | |
|---|---|---|---|---|
| 2002/0094022 A1* | 7/2002 | Bially | .......... | H04B 1/7102 375/148 |
| 2004/0133526 A1* | 7/2004 | Shmueli | .......... | G06Q 30/06 705/80 |

(Continued)

FOREIGN PATENT DOCUMENTS

| | | | | |
|---|---|---|---|---|
| CN | 108469983 A | * | 8/2018 | ......... G06F 9/45558 |
| JP | 2011170787 A | | 9/2011 | |

(Continued)

OTHER PUBLICATIONS

International Search Report dated Jan. 28, 2020 in Int'l Application No. PCT/KR2019/006072 (Search Report cited to show evidence of relevance, no english translation).

*Primary Examiner* — Emerson C Puente
*Assistant Examiner* — Zhi Chen
(74) *Attorney, Agent, or Firm* — Panitch Schwarze Belisario & Nadel LLP

(57) ABSTRACT

A method of placing a virtual machine may include: calculating virtual machine workload information, which is a load of the physical machine applied by the virtual machine through a predetermined method of calculating a workload on the basis of information stored in storage and related to operations of the first physical machine and the second physical machine; calculating initial predicted virtual load information related to an initial predicted virtual load related to a load of the physical machine predicted due to the virtual machine for a predetermined period on the basis of the virtual machine workload; calculating search placement (Continued)

information related to a search placement which is a placement of the virtual machine on the first physical machine and the second physical machine through a predetermined method of calculating a search placement; and placing the virtual machine on the physical machine again on the basis of the selected search placement.

6 Claims, 5 Drawing Sheets

(56) References Cited

U.S. PATENT DOCUMENTS

| | | | | |
|---|---|---|---|---|
| 2007/0162584 A1* | 7/2007 | Kokusho | ............ | G06F 11/3452 709/223 |
| 2010/0332658 A1* | 12/2010 | Elyashev | ............ | G06F 9/505 709/226 |
| 2013/0111492 A1* | 5/2013 | Nojiri | ............ | G06F 1/3203 718/104 |
| 2013/0212578 A1* | 8/2013 | Garg | ............ | H04L 41/0668 718/1 |
| 2014/0019964 A1* | 1/2014 | Neuse | ............ | G06F 9/45558 718/1 |
| 2014/0142870 A1* | 5/2014 | Duan | ............ | G01M 3/2815 702/47 |
| 2015/0081911 A1* | 3/2015 | Li | ............ | G06N 3/126 709/226 |
| 2016/0321559 A1* | 11/2016 | Rose | ............ | G06N 10/00 |
| 2017/0366413 A1* | 12/2017 | Yoshida | ............ | G06F 9/45558 |
| 2018/0018567 A1* | 1/2018 | Yoshizumi | ............ | G06F 17/11 |
| 2018/0032892 A1* | 2/2018 | Mould | ............ | G16H 20/10 |
| 2018/0044207 A1* | 2/2018 | Li | ............ | C02F 1/66 |
| 2018/0225823 A1* | 8/2018 | Zhou | ............ | G06N 3/084 |
| 2019/0122099 A1* | 4/2019 | Dung | ............ | G06N 3/084 |
| 2020/0019841 A1* | 1/2020 | Shaabana | ............ | G06N 3/08 |
| 2021/0232656 A1* | 7/2021 | Marumo | ............ | G06N 20/10 |

FOREIGN PATENT DOCUMENTS

| | | |
|---|---|---|
| JP | 2012159928 A | 8/2012 |
| JP | 2014006739 A | 1/2014 |
| KR | 20120023703 A | 3/2012 |
| KR | 101867487 B1 | 7/2018 |

* cited by examiner

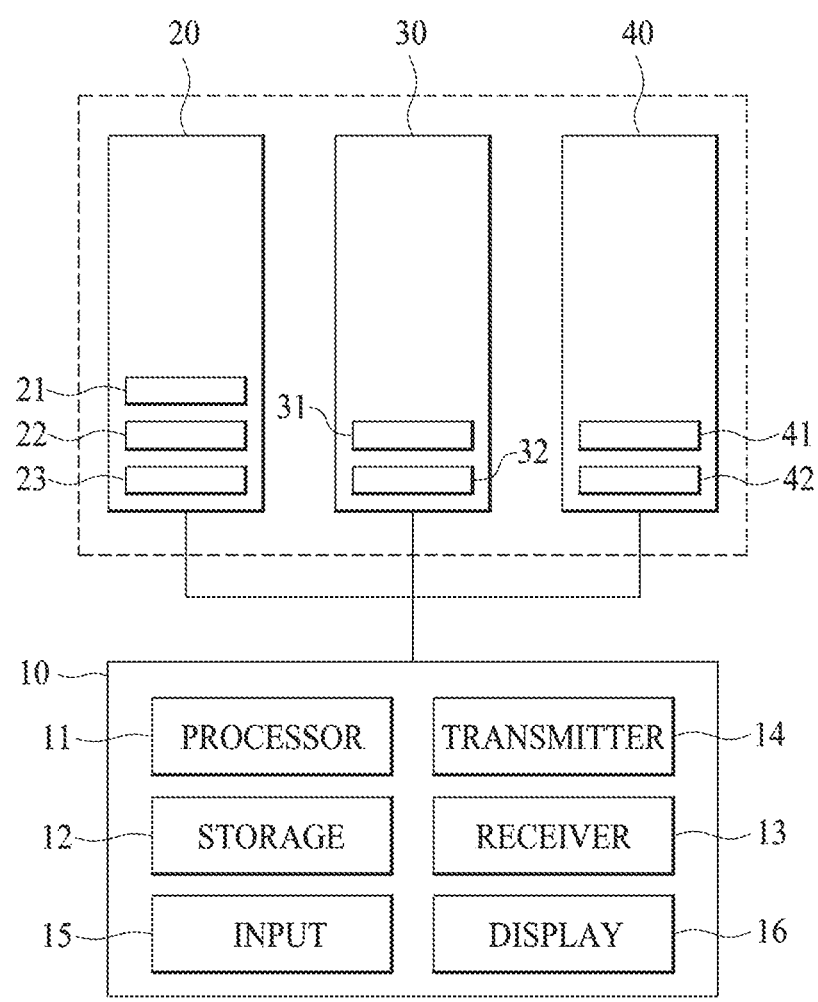

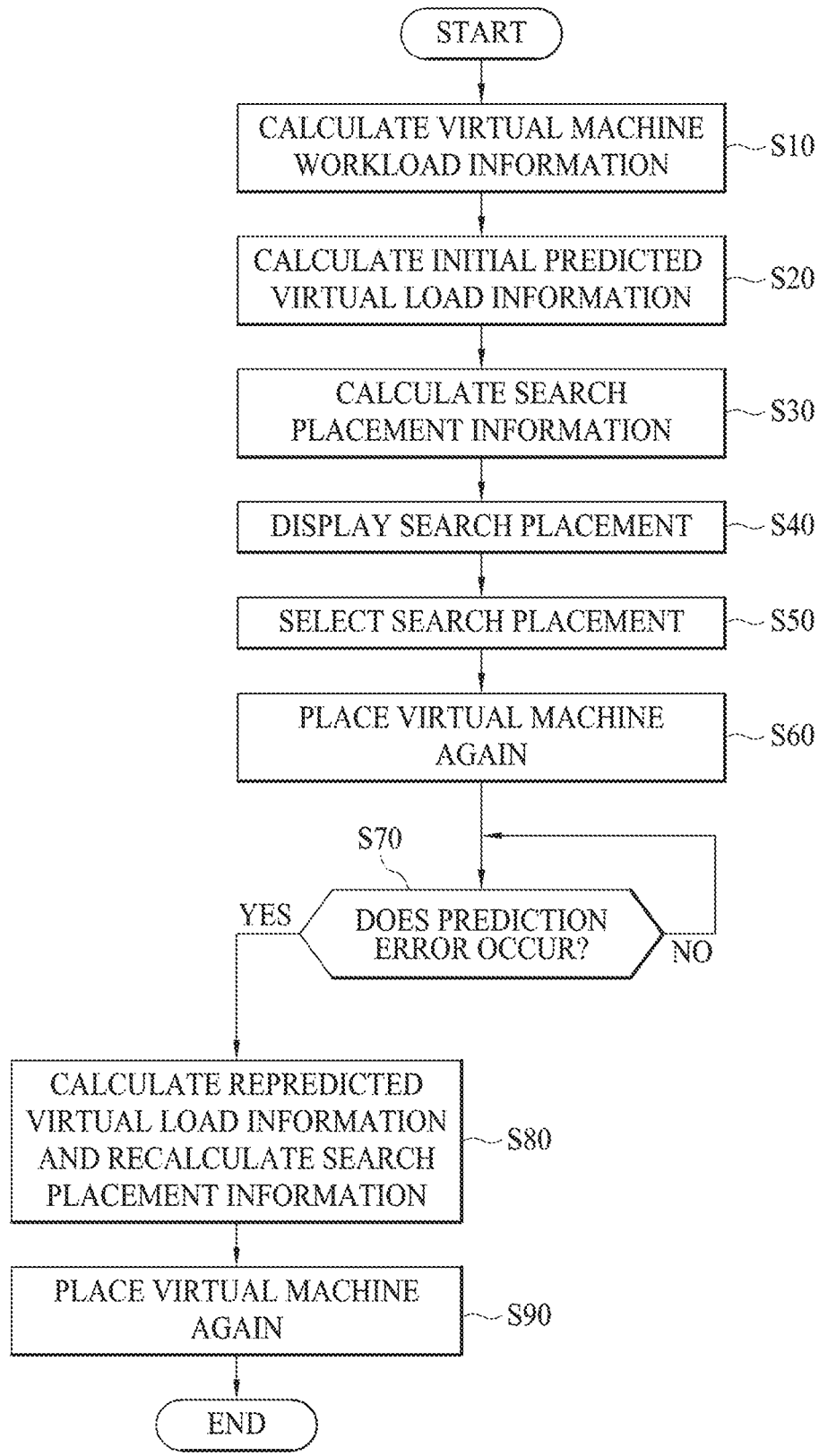

VIRTUAL MACHINE PLACEMENT METHOD AND VIRTUAL MACHINE PLACEMENT DEVICE IMPLEMENTING THE SAME

CROSS-REFERENCE TO RELATED APPLICATION

This application is a Section 371 of International Application No. PCT/KR2019/006072, filed May 21, 2019, which has not yet published, which claims priority under 35 U.S.C. § 119(b) to Korean Application No. KR10-2019-0049976, filed Apr. 29, 2019, the disclosures of which are incorporated herein by reference.

BACKGROUND

1. Field of the Invention

The present invention relates to a method of placing a virtual machine and a virtual machine placement apparatus realizing the same for placing a plurality of virtual machines on a first physical machine and a second physical machine so as to efficiently operate the first physical machine and the second physical machine in which the plurality of virtual machines are disposed.

2. Discussion of Related Art

Although data centers which occupy 2% of worldwide power consumption are high-density energy-consuming buildings which consume the most electric power in a single building, conservative operations are maintained in which stability is the first priority so that an inefficient operation status is maintained. From now on, since small data centers are expected to be integrated into large data centers such as 'hyperscale' and 'mega' data centers due to proliferation of the Internet of Things, big data, cloud technologies, and the like, the operational and managerial complexities of the data centers are also expected to intensify. Therefore, it is very important to maximize operational efficiency of the data center by converting modes of unnecessary machines to idle or sleep modes and maximally stably operating available machines, and to properly place numerous virtual machines disposed in the data centers so as to contribute to reduction of operating costs by reducing amounts of power consumptions.

In a virtual environment in which virtual machines (VMs) are formed using physical machines (PMs), the running virtual machines may be moved to other physical machines, and this movement is referred to as a live migration. This is a necessary management method of efficiently managing the data center. However, in a case in which the migration is performed, there is a risk of losing data, and there are disadvantages in that a large portion of a resource is occupied therefor, and the like.

Here, in the related art (Japanese Patent Publication No. 5827594, registered on Oct. 23, 2015), a balance between physical machines is maintained using a method of reducing loads of physical machines, to which the loads are applied, by performing a migration in a case in which a load greater than or equal to a critical value is applied to an arbitrary physical machine at a specific time point. However, in such a method, there is a high possibility that a machine, in which a specific virtual machine is migrated, is overloaded, and thus the migration is performed again so that there is a problem in that the migration is performed many times.

SUMMARY OF THE INVENTION

The present invention is directed to providing a method of placing a virtual machine capable of stably managing data by reducing the number of migrations, and a virtual machine placement apparatus realizing the same.

However, objectives of the present invention are not limited thereto, and other objectives which are not mentioned above will be obviously understood by those skilled in the art from the following description and the accompanying drawings.

According to an aspect of the present invention, there is provided a method of placing a virtual machine, through which a plurality of virtual machines are disposed on a first physical machine and a second physical machine so as to efficiently operate a physical machine including the first physical machine and the second physical machine on which the virtual machines are installed, the method including: calculating virtual machine workload information which is information related to a virtual machine workload which is a load of the physical machine applied by the virtual machine through a predetermined method of calculating a workload on the basis of information stored in a storage and related to operations of the first physical machine and the second physical machine; calculating initial predicted virtual load information which is information related to an initial predicted virtual load related to a load of the physical machine predicted due to the virtual machine for a predetermined first period on the basis of the virtual machine workload; calculating search placement information which is information related to a search placement which is a placement of the virtual machine on the first physical machine and the second physical machine through a predetermined method of calculating a search placement; and placing the virtual machine on the first physical machine and the second physical machine on the basis of the selected search placement, wherein the predetermined method of calculating a search placement is a method of calculating a search placement of the virtual machine when a value of an objective function is minimized on the basis of the initial predicted virtual load information.

The objective function may include a first objective function which is a function related to an amount of change in a workload of the physical machine calculated according to the initial predicted virtual load for the predetermined first period.

The objective function may include a second objective function which is a function related to a difference between workloads of the physical machine calculated according to the initial predicted virtual load for the predetermined first period.

The objective function may include a third objective function which is a function related to the number of movements of the virtual machine to be disposed on the first physical machine and the second physical machine such that the virtual machine is disposed according to the search placement.

The objective function may include a first objective function which is a function related to an amount of change in a workload of the physical machine calculated according to the initial predicted virtual load for the predetermined first period, a second objective function which is a function related to a difference between workloads of the physical machine calculated according to the initial predicted virtual load for the predetermined first period, and a third objective function which is a function related to the number of movements of the virtual machine to be disposed on the first physical machine and the second physical machine such that the virtual machine is disposed according to the search placement.

The search placement may include a first search placement which is a placement of the virtual machine on the first physical machine and the second physical machine when a value of the second objective function and a value of the third objective function are minimized in a state in which the first objective function has a minimum value, a second search placement which is a placement of the virtual machine on the first physical machine and the second physical machine when a value of the first objective function and a value of the third objective function are minimized in a state in which the second objective function has a minimum value, and a third search placement which is a placement of the virtual machine on the first physical machine and the second physical machine when a value of the first objective function and a value of the second objective function are minimized in a state in which the third objective function has a minimum value.

The predetermined method of calculating a workload may be a method of calculating the virtual machine workload information on the basis of an operation extent of a central processing unit (CPU).

The predetermined method of calculating a search placement may be a method of excluding a placement of the virtual machine, in which the workload of an arbitrary physical machine is greater than or equal to an arbitrary reference, from the search placement.

The method of placing a virtual machine may further include determining whether the selected predicted virtual load information is calculated normally according to a predetermined check method on the basis of selected predicted virtual load information which is information related to a selected predicted virtual load related to a predicted load of the physical machine and real virtual workload information which is information related to a real workload of the virtual machine in a case in which the virtual machine is disposed on the first physical machine and the second physical machine according to the selected search placement.

The predetermined check method may be a method of determining that the selected predicted virtual load is calculated incorrectly in a case in which a difference between a real workload of the virtual machine and the selected predicted virtual load is greater than or equal to a predetermined value.

According to an aspect of the present invention, there is provided a virtual machine placement apparatus configured to implement a method of placing a virtual machine, through which a plurality of virtual machines are disposed on a first physical machine and a second physical machine to efficiently operate a physical machine including the first physical machine and the second physical machine on which the virtual machines are disposed, the virtual machine placement apparatus including: a processor and a storage in which a program configured to execute the method of placing a virtual machine is stored, wherein the method of placing a virtual machine includes: calculating, by the processor, virtual machine workload information which is information related to a virtual machine workload which is a load of the physical machine applied by the virtual machine through a predetermined method of calculating a workload on the basis of information stored in the storage and related to operations of the first physical machine and the second physical machine; calculating, by the processor, initial predicted virtual load information which is information related to an initial predicted virtual load related to a load of the physical machine predicted and applied due to the virtual machine for a predetermined first period from a time point at which the virtual machine workload is calculated on the basis of the virtual machine workload; calculating, by the processor, search placement information which is information related to a search placement which is a placement of the virtual machine on the first physical machine and the second physical machine through a predetermined method of calculating a search placement; and placing, by the processor, the virtual machine on the first physical machine and the second physical machine on the basis of the selected search placement, wherein the predetermined method of calculating a search placement is a method of calculating, by the processor, a search placement of the virtual machine when a value of an objective function is minimized on the basis of the initial predicted virtual load information.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 1 is a conceptual view illustrating a virtual machine placement apparatus and a relationship between the virtual machine placement apparatus and a plurality of physical machines according to one embodiment of the present invention;

FIG. 2 is a flowchart of a method of placing a virtual machine according to one embodiment of the present invention;

BEST MODE OF PRESENT INVENTION

Figure 3A:
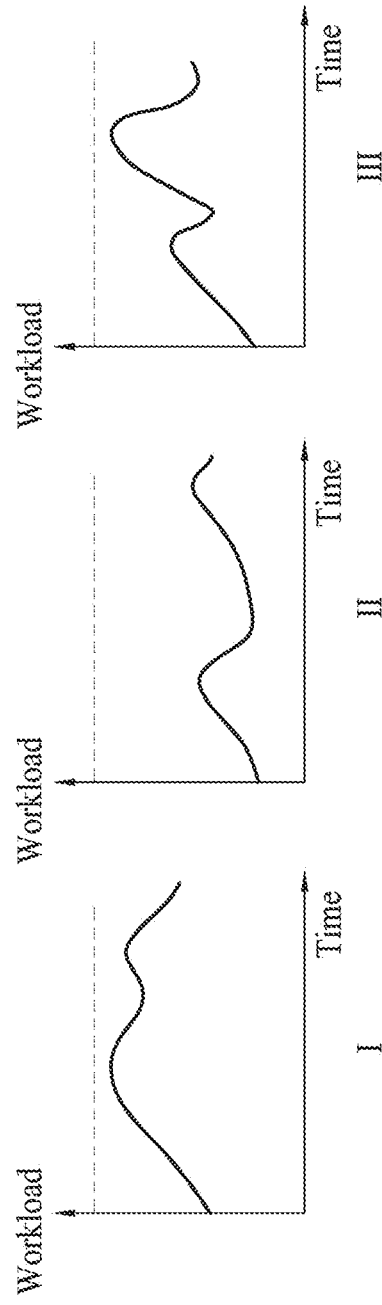
FIG. 3A and FIG. 3B is a graph for describing an effect achieved through a virtual machine placement by considering a first objective function of the method of placing a virtual machine according to one embodiment of the present invention.

A method of placing a virtual machine according to one embodiment of the present invention, through which a plurality of virtual machines are disposed on a first physical machine and a second physical machine so as to efficiently operate the physical machines including the first physical machine and the second physical machine on which the virtual machines are installed, may be a method including calculating virtual machine workload information which is information related to virtual machine workloads which are loads of the physical machines applied by the virtual machines through a predetermined method of calculating a workload on the basis of information stored in a storage and related to operations of the first physical machine and the second physical machine; calculating initial predicted virtual load information which is information related to initial predicted virtual loads related to loads of the physical machines predicted due to the virtual machines for a predetermined first period on the basis of the virtual machine workloads; calculating search placement information which is information related to a search placement which is a placement of the virtual machines on the first physical machine and the second physical machine through a predetermined method of calculating a search placement; and placing the virtual machines on the first physical machine and the second physical machine on the basis of the search placement. In addition, the predetermined method of calculating a search placement may be a method of calculating a search placement of the virtual machines when a value of an objective function is minimized on the basis of the initial predicted virtual load information.

A virtual machine placement apparatus according to one embodiment of the present invention which implements the method of placing a virtual machine and through which the plurality of virtual machines are disposed on the first physical machine and the second physical machine so as to effectively operate the physical machines including the first physical machine and the second physical machine on which the virtual machines are installed, may be a virtual machine placement apparatus including a processor and a storage in which a program configured to execute the method of placing a virtual machine is stored. In addition, the method of placing a virtual machine includes calculating, by the processor, virtual machine workload information which is information related to virtual machine workloads which are loads of the physical machines applied by the virtual machines through a predetermined method of calculating a workload on the basis of information stored in the storage and related to operations of the first physical machine and the second physical machine; calculating, by the processor, initial predicted virtual load information which is information related to initial predicted virtual loads related to loads of the physical machines, which are predicted and applied due to the virtual machines for a predetermined first period from a time point at which the virtual machine workloads are calculated on the basis of the virtual machine workloads; calculating, by the processor, search placement information which is information related to a search placement which is a placement of the virtual machines on the first physical machine and the second physical machine through a predetermined method of calculating a search placement; and placing, by the processor, the virtual machines on the first physical machine and the second physical machine on the basis of the selected search placement. In addition, the predetermined method of calculating a search placement may be a method of calculating, by the processor, the search placement of the virtual machines when a value of an objective function is minimized on the basis of the initial predicted virtual load information.

DETAILED DESCRIPTION OF EXEMPLARY EMBODIMENTS

Hereinafter, specific embodiments of the present invention will be described in detail with reference to the accompanying drawings. However, the scope of the present invention is not limited to the suggested embodiments, and other embodiments which are included in retrograde inventions or in the scope of the present invention may be easily suggested by those skilled in the art by adding, modifying, and deleting other components in the same scope of the present invention, this may also be within the scope of the present invention.

In addition, components which are illustrated in drawings for embodiments and have the same function in the same scope are assigned to and described with the same reference numerals.

FIG. 1 is a conceptual view illustrating a virtual machine placement apparatus 10 and a relationship between the virtual machine placement apparatus and a plurality of physical machines according to one embodiment of the present invention.

Referring to FIG. 1, when it is determined that detailed descriptions of well-known functions and configurations related to the present invention unnecessarily obscure the gist of the present invention in the description, the detailed descriptions will be omitted.

The virtual machine placement apparatus 10 according to one embodiment of the present invention may include a processor 11 configured to process predetermined information, a storage 12 in which predetermined information is stored, a receiver 13 configured to receive predetermined information, and a transmitter 14 configured to transmit predetermined information.

In addition, the virtual machine placement apparatus 10 may further include an input 15 configured to transmit predetermined information to the receiver 13 according to external inputs, and a medium configured to transmit a search placement, which will be described below, to a user by displaying the search placement may further include a display 16.

The processor 11 may perform calculation for processing all pieces of information required to implement the method of placing a virtual machine on the basis of predetermined information.

As an example, the processor 11 may refer to a central processing unit.

However, the processor 11 is not limited thereto and may include any apparatus or component capable of performing calculation required to implement the method of placing a virtual machine.

Information (data) required to implement the method of placing a virtual machine may be stored in the storage 12.

A program configured to execute the method of placing a virtual machine may be stored in the storage 12.

As an example, as an auxiliary storage, the storage 12 may be a hard disk.

However, the storage 12 is not limited thereto and may include any element in which information required to implement the method of placing a virtual machine may be stored.

As an example, the storage 12 may be a database.

The receiver 13 may receive predetermined information transmitted from the physical machine.

The receiver 13 may receive predetermined information related to an operation of the physical machine from the corresponding physical machine.

The transmitter 14 may transmit predetermined information to the physical machine.

The transmitter 14 may transmit a control signal output from the processor 11 to the physical machine.

Accordingly, the virtual machine placement apparatus 10 may transmit control signals to the physical machines so as to migrate a virtual machine being operated on an arbitrary physical machine to another physical machine.

As an example, the input 15 may be a keyboard.

However, the input 15 is not limited thereto, and the kind thereof may be variously changed within a level that will be clear to those skilled in the art.

As an example, the display 16 may be a display.

However, the display 16 is not limited thereto, and the kind thereof may be variously changed within a level that will be clear to those skilled in the art.

Components in the virtual machine placement apparatus 10 may be connected to each other in a wired or wireless manner.

The virtual machine placement apparatus 10 may be connected to the physical machines in a wired or wireless manner.

The physical machines may refer to hardware platforms on which virtual machines may be operated.

As an example, the physical machine may be a general desktop, a server computer, a laptop computer, a portable phone, or the like.

However, the physical machine is not limited thereto and may be a concept including any part in which a virtual machine may be operated.

Although the virtual machine placement apparatus 10 according to one embodiment of the present invention is described to basically control and manage a first physical machine 20, a second physical machine 30, and a third physical machine 40, the present invention is not limited thereto, and the number of physical machines managed and controlled by the virtual machine placement apparatus 10 may be variously changed within a level that will be clear to those skilled in the art.

According to FIG. 1, the physical machines include the first physical machine 20, the second physical machine 30, and the third physical machine 40, an $a^{th}$ virtual machine 21, a $b^{th}$ virtual machine 22, and a eh virtual machine 23 may be operated on the first physical machine 20, a $d^{th}$ virtual machine 31 and an eh virtual machine 32 may be operated on the second physical machine 30, and an $f^{th}$ virtual machine 41 and a $g^{th}$ virtual machine 42 may be operated on the third physical machine 40.

Hereinafter, a method of placing a virtual machine implemented using the virtual machine placement apparatus 10 will be described in detail.

FIG. 2 is a flowchart of a method of placing a virtual machine according to one embodiment of the present invention.

Referring to FIG. 2, the method of placing a virtual machine according to one embodiment of the present invention, through which a plurality of virtual machines are disposed on a first physical machine and a second physical machine so as to efficiently operate the physical machines including the first physical machine and the second physical machine on which the virtual machines are installed, may be a method including calculating virtual machine workload information which is information related to virtual machine workloads which are loads of the physical machines applied by the virtual machines through a predetermined method of calculating a workload on the basis of information stored in a storage and related to operations of the first physical machine and the second physical machine (S10), calculating initial predicted virtual load information which is information related to initial predicted virtual loads related to loads of the physical machines, which are predicted and applied due to the virtual machine for a predetermined first period from a time point at which the virtual machine workloads are calculated on the basis of the virtual machine workloads (S20), calculating search placement information which is information related to a search placement which is a placement of the virtual machines on the first physical machine and the second physical machine through a predetermined method of calculating a search placement (S30); and placing the virtual machines on the first physical machine and the second physical machine on the basis of the search placement (S60).

In addition, the method of placing a virtual machine may further include displaying, by the display, a plurality of search placements calculated through the predetermined method of calculating a search placement (S40).

In addition, the method of placing a virtual machine may further include inputting, by the input, a selected search placement which is one search placement of the search placements displayed on the display and transmitting information related to the selected search placement to the processor (S50).

In addition, in a case in which the virtual machines are disposed on the first physical machine and the second physical machine according to the selected search placement, the method of placing a virtual machine may further include determining whether selected predicted virtual load information is calculated normally according to a predetermined check method on the basis of the selected predicted virtual load information which is information related to selected predicted virtual loads related to loads of the predicted physical machines and real virtual workload information which is information related to real workloads of the virtual machines (S70).

Information related to an operation of the first physical machine, information related to an operation of the second physical machine, and information related to an operation of the third physical machine may be stored in the storage.

As an example, the information related to the operation of the first physical machine, the information related to the operation of the second physical machine, and the information related to the operation of the third physical machine may be stored in the storage in a time-series manner.

To this end, the receiver may receive information related to the operations of the first physical machine, the second physical machine, and the third physical machine.

As an example, the information related to the operations may also be information related to utilization rates of components of the physical machine.

The processor may calculate the virtual machine workload information which is the information related to the virtual machine workloads which are the loads of the physical machines applied by the virtual machines through the predetermined method of calculating a workload on the basis of the information stored in the storage and related to the operations of the physical machines (S10).

In a case in which the virtual machine is operated on the physical machine, the virtual machine workload may refer to a load of a resource of the corresponding physical machine.

The predetermined method of calculating a workload may be a method of calculating a virtual machine workload by calculating a load applied to a central processing unit (CPU) of the physical machine as the virtual machine is operated on the physical machine.

That is, in the predetermined method of calculating a workload, the virtual machine workload information may be calculated on the basis of only an operation extent of the CPU.

In addition, in the predetermined method of calculating a workload, it may be assumed that one virtual machine is operated on only one physical machine.

As an example, this may mean that one virtual machine is not operated on two physical machines.

In addition, in the predetermined method of calculating a workload, in a case in which the plurality of virtual machines are operated on one physical machine, the workload of the physical machine may be calculated as a physical machine workload which is the sum of the virtual machine workloads.

Accordingly, basic data required for prediction, which will be described below, is simplified, and thus prediction accuracy may be further improved in an operation which will be described below.

The processor may calculate the initial predicted virtual load information which is the information related to the initial predicted virtual loads related to the loads of the physical machines, which are predicted and applied due to the virtual machines for the predetermined first period from the time point at which the virtual machine workload information is calculated on the basis of the virtual machine workload information (S20).

The reason why the placement of the virtual machine, which will be described below, is calculated on the basis of a predicted load for a predetermined period is to solve problems in which the number of migrations may be increased and the physical machine may not be stabilized in a case in which the migration is performed on the basis of an overload at a specific time point.

As an example, the predetermined first period may be three months.

However, the predetermined first period is not limited thereto and may be variously changed within a level that will be clear to those skilled in the art.

As an example, the processor may perform a calculation related to the above-described prediction using an algorithm such as a multiple regression model, an autoregressive moving average (ARIMA) analysis, or deep learning on the basis of the virtual machine workload information.

Detailed descriptions thereof will be omitted because the calculation is a known technology to those skilled in the art.

The initial predicted virtual load may refer to a virtual machine workload predicted for the predetermined first period from an arbitrary time point or for the predetermined first period from a time point at which the virtual machine workload information is calculated.

The processor may calculate the search placement information which is the information related to the search placement which is the placement of the virtual machines on the first physical machine and the second physical machine according to the predetermined method of calculating a search placement (S30).

Here, the predetermined method of calculating a search placement may refer to a method of calculating a search placement of the virtual machine when a value of an objective function is minimized on the basis of the initial predicted virtual load information.

The predetermined method of calculating a search placement may be a method of excluding a placement of the virtual machine in which the workload of an arbitrary physical machine is greater than or equal to an arbitrary reference a (see FIGS. 3A and 4A) from the search placement.

Here, the arbitrary reference a may be 80%.

However, the arbitrary reference is not limited thereto and may be variously changed within a level that will be clear to those skilled in the art.

In addition, the objective function may include a first objective function, a second objective function, and a third objective function.

The processor may calculate three non-dominated solutions in which the objective functions have minimum values.

Hereinafter, the predetermined method of calculating a search placement will be described in detail.

Figure 3B:
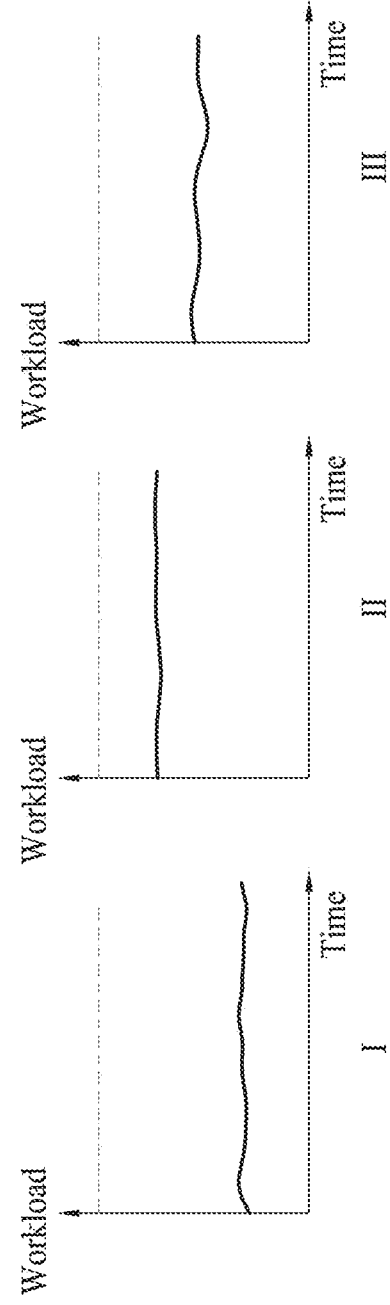

FIG. 3A and FIG. 3B is a graph for describing an effect achieved through a virtual machine placement by considering the first objective function of the method of placing a virtual machine according to one embodiment of the present invention.

Referring to FIG. 3A and FIG. 3B, the objective function may include the first objective function which is a function related to an amount of change in the workload of the physical machine calculated according to the initial predicted virtual load for the predetermined first period.

FIG. 3A is a graph for describing workloads of the first physical machine, the second physical machine, and the third physical machine in a case in which the virtual machines are disposed according to a first placement, and FIG. 3B is a graph for describing workloads of the first physical machine, the second physical machine, and the third physical machine in a case in which the virtual machines are disposed according to a second placement.

It may be seen from the above description that a workload of each of the physical machines may be calculated as the sum of virtual machine workloads installed in the corresponding physical machine.

As an example, in a case in which the virtual machines are disposed according to the first placement, the $a^{th}$ virtual machine, the $b^{th}$ virtual machine, and the eh virtual machine may be disposed in the first physical machine (I), the $d^{th}$ virtual machine and the $e^{th}$ virtual machine may be disposed in the second physical machine (II), and the $f^{th}$ virtual machine and the $g^{th}$ virtual machine may be disposed in the third physical machine(III).

As an example, in a case in which the virtual machines are disposed according to the second placement, the $a^{th}$ virtual machine may be disposed on the first physical machine (I), the $b^{th}$ virtual machine, the $d^{th}$ virtual machine, and the $f^{th}$ virtual machine may be disposed on the second physical machine (II), and the $c^{th}$ virtual machine, the $e^{th}$ virtual machine, and the $g^{th}$ virtual machine may be disposed on the third physical machine(III).

Accordingly, the present invention is not limited thereto and may be variously changed within a level that will be clear to those skilled in the art.

Referring to FIGS. 3A and 3B, it may be seen that, in the case in which the virtual machines are disposed according to the first placement, the workloads of all of the physical machines are less than or equal to the arbitrary reference, and in the case in which the virtual machines are disposed according to the second placement, the workloads of all of the physical machines are less than or equal to the arbitrary reference.

However, in the case in which the virtual machines are disposed according to the second placement, it may be seen that an amount of change (inclination) in the workload of each of the physical machines is less than that of the case in which the virtual machines are disposed according to the first placement.

Accordingly, the processor may calculate the second placement as a placement which is more suitable than the first placement as the search placement.

When a ratio of a change in the workload of the physical machine is large, the workload of the physical machine is greater than the arbitrary reference, and thus the virtual machine may be migrated.

In this case, since the above-described virtual machines may be frequently migrated, a risk of losing data of the virtual machine may be increased.

The first objective function may be a function for preventing the risk.

Figure 4A:
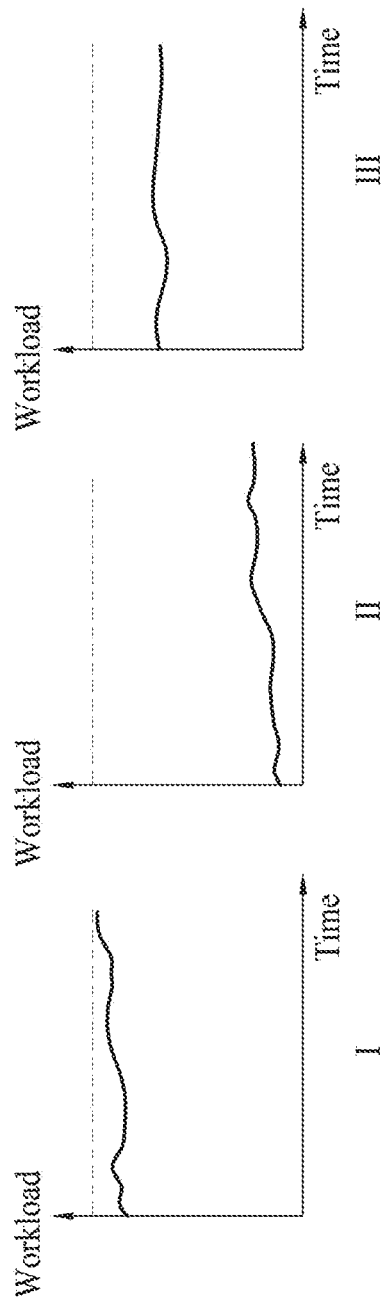
FIG. 4A and FIG. 4B is a graph for describing an effect achieved through a virtual machine placement by considering a second objective function of the method of placing a virtual machine according to one embodiment of the present invention.
Figure 4B:
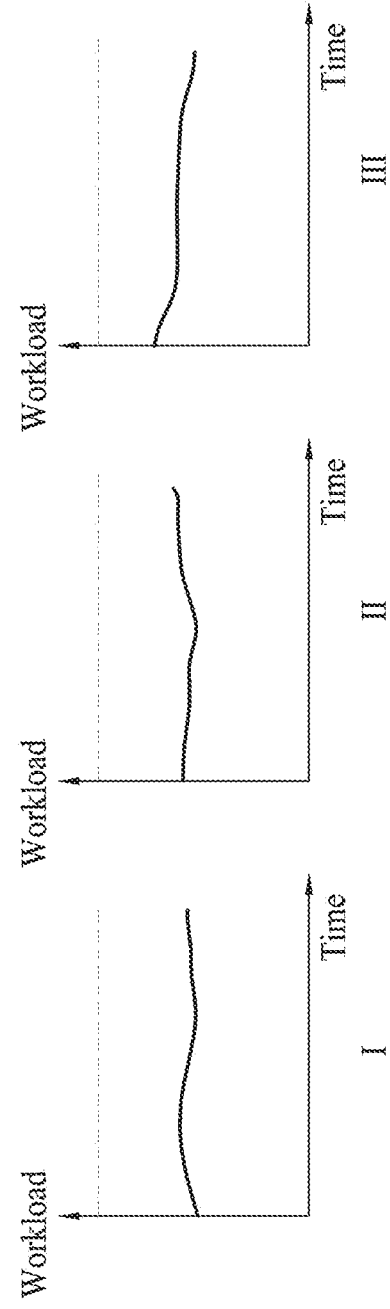

FIG. 4A and FIG. 4B is a graph for describing an effect achieved through a virtual machine placement by considering the second objective function of the method of placing a virtual machine according to one embodiment of the present invention.

Referring to FIG. 4A and FIG. 4B, the objective function may include the second objective function which is a function related to a difference between the workloads of the physical machines calculated according to the initial predicted virtual load for the predetermined first period.

FIG. 4A is a graph for describing a workload of each of the first physical machine, the second physical machine, and the third physical machine in a case in which the virtual machines are disposed according to the third placement, and FIG. 4B is a graph for describing a workload of each of the first physical machine, the second physical machine, and the third physical machine in a case in which the virtual machines are disposed according to a fourth placement.

Referring to FIG. 4A, it may be seen that, in the case in which the virtual machines are disposed according to the third placement, the workloads of all of the physical machines (I, II, III) are less than or equal to the arbitrary reference.

Referring to FIG. 4B, it may be seen that, in the case in which the virtual machines are disposed according to the fourth placement, the workloads of all of the physical machines (I, II, III) are less than or equal to the arbitrary reference.

However, in the case in which the virtual machines are disposed according to the fourth placement, a difference between the workloads of the physical machines is less than that of the case in which the virtual machines are disposed according to the third placement.

Accordingly, the processor may calculate the fourth placement as a placement which is more suitable than the third placement as the search placement.

Here, the workloads of the physical machines may be compared on the basis of average values of the workloads for the predetermined first period to compare the workloads between the physical machines.

The second objective function may be to uniformly use the physical machines.

The objective function may include the third objective function which is a function related to the number of movements of the virtual machines to be disposed on the first physical machine and the second physical machine so as to place the virtual machines according to the search placement.

In other words, the third objective function may be related to the number of movements of the virtual machines between the physical machines, from a present placement thereof, so as to place the virtual machines according to the search placement.

The third objective function may be to seek a placement in which the number of movements of the virtual machines is minimized.

The search placement may refer to a placement of the virtual machines on the physical machines in which the objective functions are minimized.

The objective function may include the first objective function which is the function related to the amount of change in workload of the physical machine calculated according to the initial predicted virtual load for the predetermined first period, the second objective function which is the function related to the change in workload of the physical machines calculated according to the initial predicted virtual load for the predetermined first period, and the third objective function which is the function related to the number of movements of the virtual machines to be disposed on the first physical machine and the second physical machine so as to place the virtual machines according to the search placement.

The display may display the search placements transmitted from the processor (S40).

The processor may calculate first search placement information which is information related to a first search placement, second search placement information which is information related to a second search placement, and third search placement information which is information related to a third search placement, and transmit information related thereto to the display.

The search placement may include the first search placement which is a placement of the virtual machines on the physical machines (such as the first physical machine and the second physical machine) and in which a value of the second objective function and a value of the third objective function are minimized in a state in which the first objective function has a minimum value, the second search placement which is a placement of the virtual machines on the physical machines (such as the first physical machine and the second physical machine) and in which a value of the first objective function and a value of the third objective function are minimized in a state in which the second objective function has a minimum value, and the third search placement which is a placement of the virtual machines on the physical machines (such as the first physical machine and the second physical machine) and in which a value of the first objective function and a value of the second objective function are minimized in a state in which the third objective function has a minimum value.

The display may display the first search placement, the second search placement, and the third search placement.

The first search placement, the second search placement, and the third search placement may refer to solutions independent of each other as non-dominated solutions of the objective functions.

An operator may select one search placement among the first search placement, the second search placement, and the third search placement and input the selected search placement through the input.

The input may calculate information related to the selected search placement and transmit the corresponding information to the processor.

Figure 5:
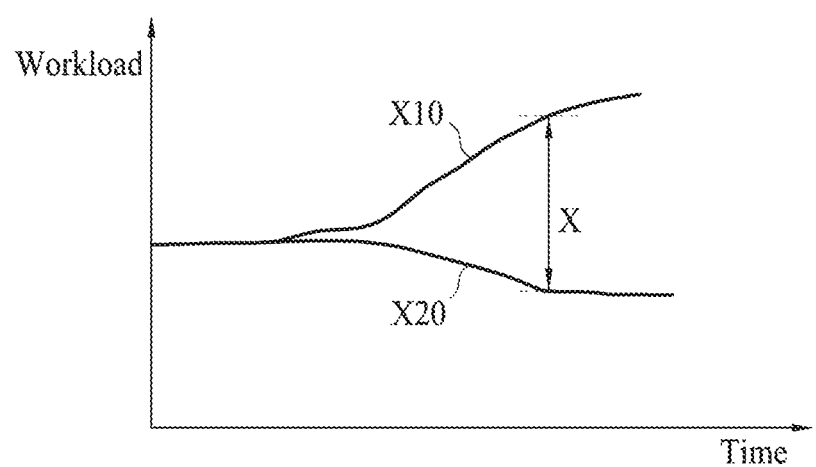
FIG. 5 is a graph for describing a method of calculating a prediction error of the method of placing a virtual machine according to one embodiment of the present invention.

FIG. 5 is a graph for describing a method of calculating a prediction error of the method of placing a virtual machine according to one embodiment of the present invention.

The processor may place the virtual machines on the physical machines again on the basis of the selected search placement (S60).

Through this method, resources of the physical machines may not be allocated to one physical machine and may be uniformly used.

In addition, after the virtual machines are disposed on the physical machines according to the selected search placement, the processor may determine whether the selected predicted virtual load information is calculated normally according to the predetermined check method on the basis of the selected predicted virtual load information which is the information related to the selected predicted virtual loads related to the loads of the predicted physical machines and the real virtual workload information which is the information related to the real workloads of the virtual machines (S70).

Here, the selected predicted virtual load information may be the same as the above-described initial predicted virtual load information.

However, the selected predicted virtual load information is not limited thereto and may not be the same as the initial predicted virtual load information.

In this case, after the processor places the virtual machines according to the selected search placement, the processor may predict workloads of the virtual machines for a predetermined period to calculate the selected predicted virtual load information.

The predetermined check method may be a method of determining that a selected predicted virtual load is calculated incorrectly in a case in which a difference between the real virtual workload and the corresponding selected predicted virtual load is greater than or equal to a predetermined value.

As a specific example, FIG. 5 may be a graph related to a first workload X10 showing a selected predicted virtual load which is a predicted workload of the $a^{th}$ virtual machine and a second workload X20 showing a real workload of the $a^{th}$ virtual machine.

The processor may determine that the workload of the $a^{th}$ virtual machine is predicted incorrectly in a case in which a difference between the first workload and the second workload is greater than or equal to a predetermined workload X (predetermined value).

In a case in which the processor determines that the selected predicted virtual loads are calculated incorrectly, the processor may calculate repredicted virtual load information which is information related to repredicted virtual loads related to loads of the physical machines predicted due to the virtual machines for a predetermined second period from a time point at which it is determined that the selected predicted virtual loads are calculated incorrectly (S80).

The processor may recalculate a search placement through the above-described predetermined method of calculating a search placement on the basis of the repredicted virtual load information (S80) and may perform a predetermined calculation to place the virtual machines again on the basis thereof (S90).

The detailed description related thereto will be omitted in a range in which the detailed description overlaps the above-described description.

Here, the predetermined second period may be the same as or different from the above-described predetermined first time period.

The method of placing a virtual machine may be repeatedly consecutively performed.

In order to place the virtual machines again (S90), the operator may select one search placement among a plurality of search placements, and the processor may place the virtual machines again on the basis of the selected search placement (S90).

The detailed description related thereto will be omitted in a range in which the detailed description overlaps the above-described description.

As described above, a method of placing a virtual machine and a virtual machine placement apparatus realizing the same can minimize a data loss.

In addition, the method can minimize the requirement of a resource.

In addition, the method can stably manage a data center.

However, effects of the present invention are not limited to the above-described effects, and effects which have not been described above will be clearly understood by those skilled in the art through the description and the accompanying drawings.

In the accompanying drawings, configurations which are not related or are less related to the technical spirit of the present invention have been simply illustrated or omitted to more clearly illustrate the technical spirit of the present invention.

In the above description, although the configurations and features of the present invention have been described on the basis of the embodiments according to the present invention, the present invention is not limited thereto, and it is clear to those skilled in the art that the present invention may be variously changed or modified within the spirit and range of the present invention, and thus, the changes or modifications will fall within the range of the appended claim.

What is claimed is:

1. A method of placing one or more virtual machines from a plurality of virtual machines that are disposed on a physical machine system including at least a first physical machine and a second physical machine, so as to efficiently operate the physical machine system on which the plurality of virtual machines are installed, the method comprising:

calculating a virtual machine workload which is a load of each physical machine of the physical machine system caused by the plurality of virtual machines through a predetermined method of calculating a workload on the basis of information stored in a storage and related to operations of each physical machine of the physical machine system;

calculating an initial predicted virtual load which is related to a predicted load of each physical machine of the physical machine system caused by the plurality of virtual machines for a predetermined first period on the basis of the virtual machine workload;

calculating at least one search placement which is related to a placement of the one or more virtual machines from the plurality of virtual machines on the physical machine system through a predetermined method of calculating a placement of a virtual machine; and placing the one or more virtual machines on the physical machine system on the basis of a placement which is selected from the at least one search placement, wherein the predetermined method of calculating a placement of a virtual machine is a method of calculating the at least one search placement of one or more virtual machines when a value of an objective function is minimized on the basis of the initial predicted virtual load, wherein the objective function includes a first objective function which is related to an amount of change in a load of each physical machine calculated according to the initial predicted virtual load for the predetermined first period; a second objective function which is related to a difference between a load of each physical machine of the physical machine system calculated according to the initial predicted virtual load for the predetermined first period; and a third objective function which is related to the number of movements of each virtual machine to be disposed on the physical machine system such that one or more virtual machines are disposed according to the search placement, and wherein the at least one search placement includes a first search placement which is a placement when a value of the second objective function and a value of the third objective function are minimized in a state in which the first objective function has a minimum value, a second search placement which is a placement when a value of the first objective function and a value of the third objective function are minimized in a state in which the second Objective function has a minimum value; and a third search placement which is a placement when a value of the first objective function and a value of the second objective function are minimized in a state in which the third objective function has a minimum value.

2. The method of claim 1, wherein the predetermined method of calculating a workload is a method of calculating the virtual machine workload on the basis of an operation of a central processing unit (CPU).

3. The method of claim 2, wherein the predetermined method of calculating a placement of a virtual machine includes a method of excluding a placement of the one or more virtual machines from the plurality of virtual machines on the physical machine system, in which a load of an arbitrary physical machine is greater than or equal to an arbitrary reference.

4. The method of claim 1, further comprising determining whether a selected predicted virtual load is calculated normally according to a predetermined check method on the basis of the selected predicted virtual load and a real virtual workload, the selected predicted virtual load being a predicted load in a case in which a given virtual machine is disposed on the physical machine system according to a placement which is selected among the at least one search placement, the real virtual workload being related to a real workload of the given virtual machine in a case in which the given virtual machine is deposed on the physical machine system according to a placement which is selected among the at least one search placement.

5. The method of claim 4, wherein the predetermined check method is a method of determining that the selected predicted virtual load is calculated incorrectly in a case in which a difference between the real workload of the given virtual machine and the selected predicted virtual load is greater than or equal to a predetermined value.

6. A virtual machine placement apparatus configured to implement a method of placing one or more virtual machines from a plurality of virtual machine that are disposed on a physical machine system including at least a first physical machine and a second physical machine to efficiently operate the physical machine system on which the plurality of virtual machines are installed, the virtual machine placement apparatus comprising:

a processor; and a storage in which a program configured to execute the method of placing the one or more virtual machines is stored, wherein the method of placing the one or more virtual machines includes:

calculating, by the processor, a virtual machine workload which is a load of each physical machine of the physical machine system caused by the plurality of virtual machines through a predetermined method of calculating a workload on the basis of information stored in a storage and related to operations of each physical machine of the physical machine system;

calculating, by the processor, an initial predicted virtual load which is related to a predicted load of each physical machine of the physical machine system caused by the plurality of virtual machines for a predetermined first period on the basis of the virtual machine workload;

calculating, by the processor, at least one search placement which is related to a placement of the one or more virtual machines from the plurality of virtual machines on the physical machine system through a predetermined method of calculating a placement of a virtual machine; and placing, by the processor, the one or more virtual machines on the physical machine system on the basis of a placement which is selected from the at least one search placement, wherein the predetermined method of calculating a placement of a virtual machine is a method of calculating the at least one search placement of one or more virtual machines when a value of an Objective function is minimized on the basis of the initial predicted virtual load, wherein the objective function includes a first Objective function which is related to an amount of change in a load of each physical machine calculated according to the initial predicted virtual load for the predetermined first period; a second objective function which is related to a difference between a load of each physical machine of the physical machine system calculated according to the initial predicted virtual load for the predetermined first period; and a third objective function which is related to the number of movements of each virtual machine to be disposed on the physical machine system such that one or more virtual machines are disposed according to the search placement, and wherein the at least one search placement includes a first search placement which is a placement when a value of the second objective function and a value of the third objective function are minimized in a state in which the first objective function has a minimum value, a second search placement which is a placement when a value of the first objective function and a value of the third objective function are minimized in a state in which the second Objective function has a minimum value; and a third search placement which is a placement when a value of the first objective function and a value of the second objective function are minimized in a state in which the third objective function has a minimum value.

* * * * *